United States Patent

[11] 3,608,987

[72] Inventor  Kenneth K. Jordan
                Bradley, W. Va.
[21] Appl. No. 865,137
[22] Filed     Oct. 9, 1969
[45] Patented  Sept. 28, 1971
[73] Assignee  Electric & Machine Company
                Huntington, W. Va.

[54] SEAL FOR CONVEYER ROLLER BEARING
     4 Claims, 3 Drawing Figs.
[52] U.S. Cl. .................................................. 308/187,
                                                               308/187.1
[51] Int. Cl. ......................................................... F16c 13/00,
                                                               F16c 33/78
[50] Field of Search ........................................... 308/187.1,
                                                               187.2, 187, 20

[56]            References Cited
            UNITED STATES PATENTS
2,757,988   8/1956   Lecourbe .................... 308/20

FOREIGN PATENTS
818,296    10/1951   Germany ..................... 308/187.1
1,219,425  12/1959   France ........................ 308/20

Primary Examiner—Martin P. Schwadron
Assistant Examiner—Frank Susko
Attorney—William S. Rambo ABSTRACT: A seal incorporated in an antifriction-bearing unit of the type used in mounting conveyor belt supporting or similar rollers. It comprises a one-piece seal in the form of an annular collar, preferably of nylon, which rotates with the roller and relative to the roller axle hub or bearing retainer. The seal collar is of such a cross section that it provides three relatively spaced annular sealing and bearing surfaces which effectively contact with adjacent fixed surfaces to seal lubricant in the bearing unit and to prevent the entry of dust into the bearing unit.

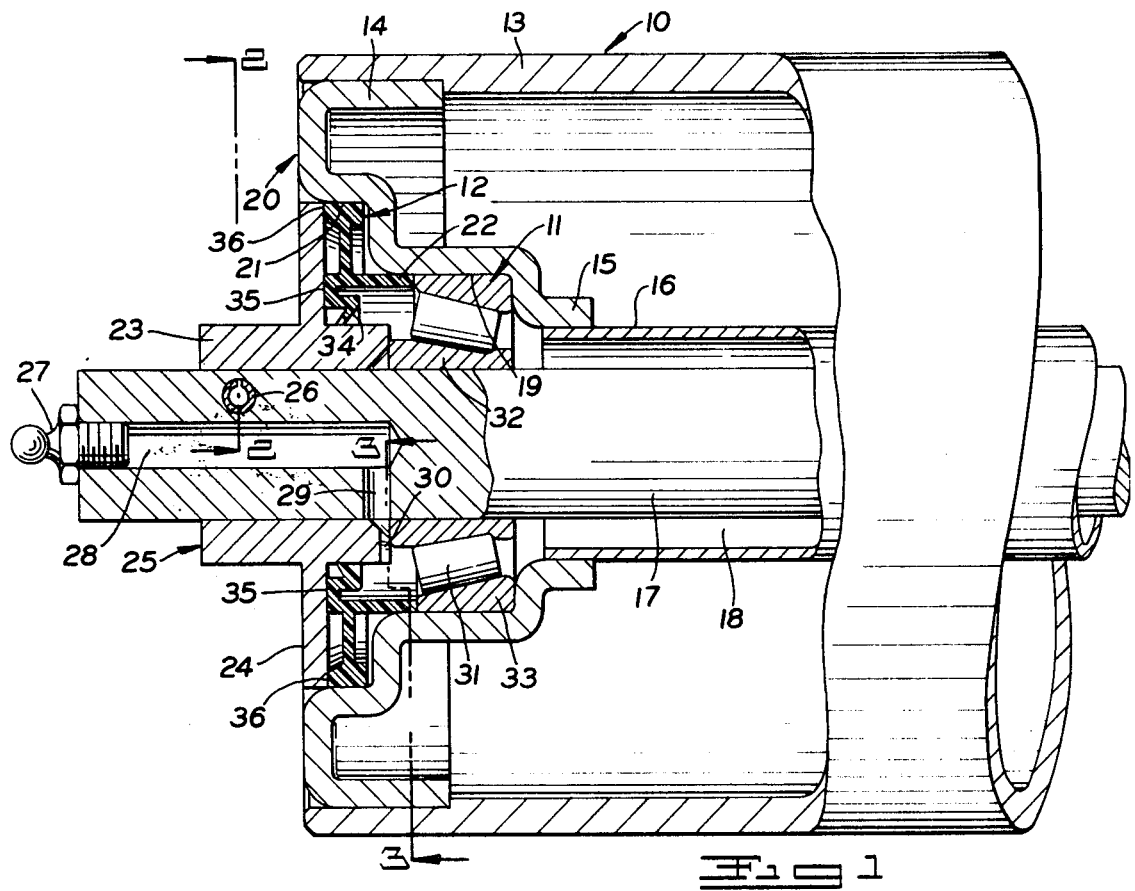
Fig. 1
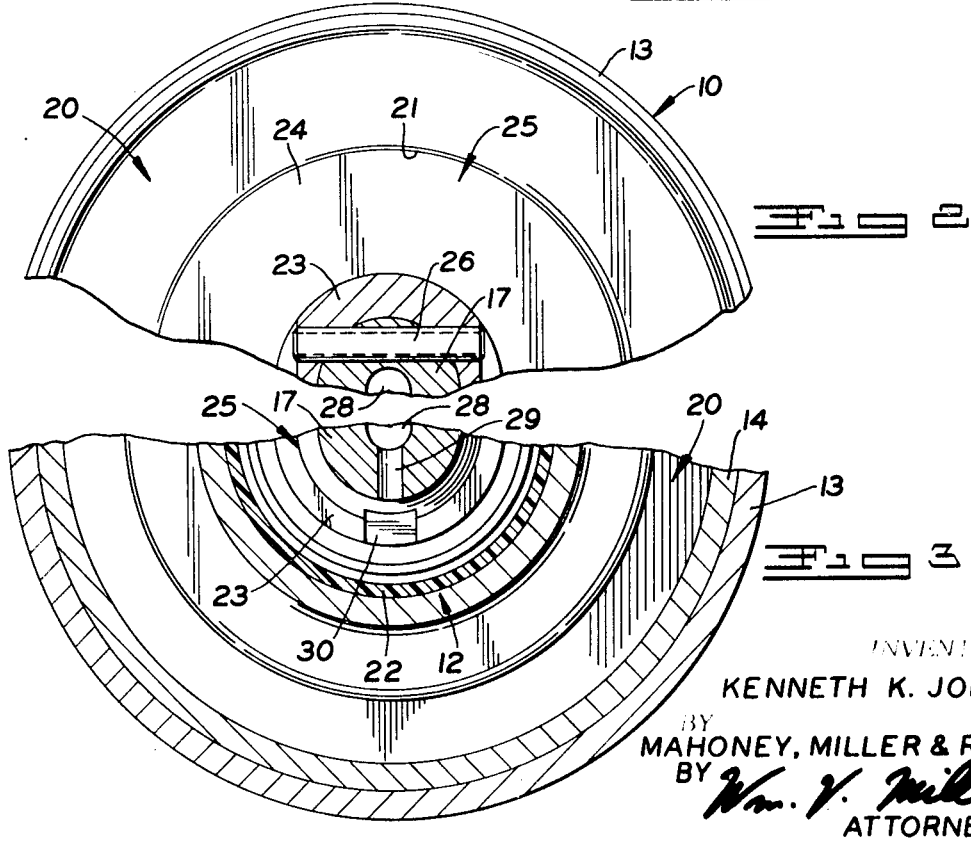
Fig. 2
Fig. 3
INVENTOR
KENNETH K. JORDAN
BY MAHONEY, MILLER & RAMBO
BY Wm. V. Miller
ATTORNEYS

SEAL FOR CONVEYER ROLLER BEARING

The present invention provides for a bearing seal for use with an antifriction bearing, such as a roller bearing, which is of such a nature that it reduces friction and wear as compared to seals in the prior art. Prior art seals usually comprise one or more annular axially compressible washers or seal members or incompressible washers or seal members held together with axial spring pressure. These arrangements introduced excessive friction and wear and, therefore, were not entirely satisfactory.

In the accompanying drawing, I have illustrated a preferred from of my invention and in this drawing:

FIG. 1 is a view mainly in axial section but partly in elevation illustrating my seal arrangement applied to a bearing unit of the roller type.

FIG. 2 is a transverse sectional view taken along line 2—2 of FIG. 1.

FIG. 3 is a transverse sectional view taken along line 3—3 of FIG. 1.

With reference to the drawing in detail, I have illustrated my invention applied to a roller indicated generally at 10 which is of a type commonly employed for supporting a belt for transporting materials which create dust that tend to enter the roller bearing unit indicated generally at 11. To overcome this tendency, I provide a special seal arrangement, according to this invention, which is indicated generally at 12. It is to be understood, however, that my invention is not limited to this particular type of conveyor roller 10 nor to the particular type of roller bearing 11.

Only one end of the roller 10 is shown but it will be understood that both ends will be identical. The roller comprises an outer cylindrical shell 13 which has an end cup 20 with a peripheral skirt 14 which is press-fitted, welded, or otherwise nonrotatably fixed within the end of the shell. The cup 20 is further provided with an innermost axially inwardly extending flange 15 which is similarly fixed on the adjacent end of a tube 16 that surrounds the roller shaft or axle 17 and provides an annular space 18 therearound which serves as a grease reservoir.

The roller bearing unit which rotatively supports the roller 10 on the axle 17 and is disposed within an annular recess or chamber 19. Axially outwardly of the recess or chamber 19, in the cup 20, is another annular recess or chamber 21 which extends radially outwardly beyond the recess 19 and receives the annular seal 12 that also has a central collar or skirt portion 22 that extends into the recess 19 which is concentric with the recess 21. A dust cap and bearing retainer 25 is provided with a central hub 23 which surrounds the adjacent end of the axle 17 and is fixed thereto, and which is provided with a radially outwardly extending peripheral flange 24 that is snugly fitted within the recess 21 but permits rotation of the cup 20 on the cap 25. The hub 23 is fixed on the axle 17 by means of a common type of split spring pin 26 extending transversely through aligning openings in the hub 23 and the axle 17. The axle 17 and cap 25 remain stationary and the cup 20 and roller shell 13 and tube 16 rotate together as a unit relative thereto.

The outer end of the axle 17 projects from the hub 23 and is provided with a lubricant gun fitting 27 which leads into a central bore 28 that connects with a transverse bore 29 at its inner end, leading radially outwardly and connected with a radial slot 30 cut in the inner edge of the hub 23. This lubricating arrangement supplies grease to the roller bearing unit 11.

The bearing unit 11 shown is of the roller type including the tapered rollers 31 disposed on an inner raceway 32 which is fixed on the axle 17 and an outer retainer 33 which is press-fitted within the recess 19 of cup 20 for rotation therewith.

The seal 12 is the form of an annular one-piece collar made of a suitable substantially rigid resin or plastic of the thermosetting type such as polyamide resin, specifically, nylon. As previously indicated, it is of special cross-sectional form to provide three relatively spaced annular sealing and bearing surfaces. As previously indicated, it is provided with an annular inner skirt 22 and this skirt has an inner edge extremity that engages the bearing retainer 33 being axially held thereagainst by the cap 25. The seal skirt 22 is pressed within the recess 19 for rotation with the cup 20 and the conveyor supporting roller 10. The seal is also provided with an annular inner sealing lip 34 which surrounds and firmly engages the inner portion of the hub 23 so as to provide an annular surrounding sealing and bearing surface rotatable thereon. Spaced radially outwardly from the seal 34 and also axially outwardly is an annular rib providing another annular sealing surface or face 35 which will contact with the inner flat surface of the cap flange 24 and will rotate relative thereto in contact therewith. The third sealing surface is provided at the outer periphery of the seal by means of an outer rim which is disposed within the recess 21 and has an outer flat face 36 engaging with the flat inner face of the flange 24 and rotatable in contact therewith. There is a slight clearance between the periphery of the rim and the recess 21 so that slight axial movement of the rim is permitted when the flange 24 presses axially inwardly on it. Before installation, the rim face 36 will be disposed slightly axially outwardly of the plane of the rib face 35 but when installed, the flange 24 will press against the face 36 and overcome the resiliency of the material of the seal 12 so that both faces 35 and 36 will be in a common plane in contact with the flange 24. This resilient or spring contact at 36 and the clearance around the rim at the recess 21, which permits axial floating, will compensate for wear. Thus, there is provided the innermost annular sealing and bearing surface 34, the intermediate sealing and bearing surface 35, and the outermost sealing and bearing surface 36 which provides three annular sealing surfaces at radially spaced positions which will prevent dust from reaching the roller bearing unit 11 and will prevent lubricant from leaking out of that unit.

It will be apparent that my sealing arrangement provides an effective seal without the introduction of excessive friction into the unit. The nylon-to-metal contact at each sealing surface provides for self-lubricating, sealing and bearing surfaces.

Having thus described my invention, what I claim is:

1. In a roller assembly which includes a cylindrical roller having an end cup formed with a plurality of axially inwardly adjoining cylindrical recesses of progressively diminishing diameters, an axle extending coaxially through said roller and end cup, an antifriction bearing having an outer race carried within a smaller diameter recess of said end cup and supporting said roller for axial rotation on said axle, and a generally cylindrical dust cap having an axially extending hub portion secured to said axle in axially outwardly spaced relation to said bearing and having a relatively larger diameter flange portion disposed in closing relation to the recesses of said end cup; that improvement which comprises an annular seal member fitted in the recesses of said end cup between the flange portion of said dust cap and said bearing, said seal member being formed with an inner collar portion having a sealing surface rotatively engaging the hub portion of said cap, an axially projecting annular skirt portion extending into the smaller diameter recess of said cup and engaging the outer race of said bearing, an intermediate annular rib having a flat sealing surface disposed in rotative contact with the flange of said cap, and an outer rim portion positioned in a larger diameter recess of said end cup and having a flat sealing surface disposed in rotative contact with the flange of said cap adjacent the periphery thereof.

2. The assembly as defined in claim 1, wherein said seal member is composed of a substantially incompressible plastic material and is of one-piece form.

3. The assembly as defined in claim 2, wherein said plastic material is a polyamide (Nylon) resin.

4. The assembly as defined in claim 1, wherein the flat sealing surface of the outer rim portion of said seal member resiliently engages the flange of said cap and a clearance is provided between said rim portion and said end cup to permit limited axial movement of said rim portion within said end cup.